(12) United States Patent
Miyata

(10) Patent No.: US 7,547,039 B2
(45) Date of Patent: Jun. 16, 2009

(54) AIRBAG APPARATUS AND MOTORCYCLE HAVING THE SAME

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 278 days.

(21) Appl. No.: 11/470,924

(22) Filed: Sep. 7, 2006

(65) Prior Publication Data

US 2007/0069506 A1 Mar. 29, 2007

(30) Foreign Application Priority Data

Sep. 26, 2005 (JP) ............................. 2005-277293

(51) Int. Cl.
*B60R 21/20* (2006.01)
(52) U.S. Cl. ............... 280/730.1; 280/728.2; 280/743.2
(58) Field of Classification Search .............. 280/730.1, 280/728.3, 743.2, 743.1
See application file for complete search history.

(56) References Cited

U.S. PATENT DOCUMENTS

| 5,482,313 | A | * | 1/1996 | Ikeya et al. ............... 280/728.2 |
| 5,851,023 | A | * | 12/1998 | Nagata et al. ............ 280/728.3 |
| 6,007,090 | A | | 12/1999 | Hosono et al. |
| 6,616,176 | B2 | * | 9/2003 | Uchiyama et al. ........ 280/728.3 |
| 6,695,339 | B2 | * | 2/2004 | Hayashi ................... 280/728.3 |
| 7,040,649 | B2 | * | 5/2006 | Totani et al. ............. 280/728.3 |
| 7,121,577 | B2 | * | 10/2006 | Schenck et al. .......... 280/728.3 |
| 7,293,793 | B2 | * | 11/2007 | Miyata .................... 280/730.1 |
| 2004/0150197 | A1 | * | 8/2004 | Iijima et al. .............. 280/730.1 |
| 2007/0052214 | A1 | * | 3/2007 | Miyata .................... 280/730.1 |
| 2007/0052215 | A1 | * | 3/2007 | Miyata .................... 280/730.1 |
| 2007/0052216 | A1 | * | 3/2007 | Miyata .................... 280/730.1 |
| 2007/0052217 | A1 | * | 3/2007 | Miyata .................... 280/730.1 |
| 2007/0052218 | A1 | * | 3/2007 | Miyata .................... 280/730.1 |
| 2007/0120346 | A1 | * | 5/2007 | Kwon ...................... 280/728.2 |

FOREIGN PATENT DOCUMENTS

| JP | 2002-137779 A | 5/2002 |
| JP | 2002-137780 A | 5/2002 |

OTHER PUBLICATIONS

European Search Report dated Oct. 15, 2007, based on European Application No. 06017555.1-2425.

* cited by examiner

*Primary Examiner*—Ruth Ilan
*Assistant Examiner*—Drew J. Brown
(74) *Attorney, Agent, or Firm*—Fitch, Even, Tabin & Flannery

(57) ABSTRACT

A technique is provided effective in preventing liquid from flowing from the exterior of an airbag cover into an airbag housing in a motorcycle airbag apparatus with a structure in which the airbag opening of an airbag housing is covered with an airbag cover. In one form, an airbag apparatus mounted to a motorcycle is constructed such that the upper end of a retainer wall is dispose above webbing through holes so as to prevent liquid influx from the exterior of a module cover through the webbing through holes into a retainer.

18 Claims, 14 Drawing Sheets

AIRBAG APPARATUS AND MOTORCYCLE HAVING THE SAME

FIELD OF THE INVENTION

The present invention relates to a technique of constructing an airbag apparatus to be mounted to a motorcycle.

BACKGROUND OF THE INVENTION

There have been various known techniques of restraining occupants of motorcycles with airbag apparatuses. For example, known techniques include a technique of restraining an occupant with an airbag inflated by inflation gas in a frontal collision (e.g., refer to Japanese Unexamined Patent Application Publication No. 2003-327182). The airbag apparatus disclosed in Japanese Unexamined Patent Application Publication No. 2003-327182 has a structure in which a pre-folded airbag is housed in a housing and in which an airbag opening of the housing is covered with an airbag cover (covering member). The airbag cover is torn open along a fragile portion with the deploying motion of the airbag to open the airbag opening, thereby enabling the deploying motion of the airbag from the interior of the housing to the exterior.

In the airbag apparatus described in Japanese Unexamined Patent Application Publication No. 2003-327182, water or oil may flow into the airbag housing through a hole or opening of the airbag cover from the exterior. For example, when a tether is employed for tethering the airbag to the vehicle body, the airbag cover has a tether through hole for the tether to pass through so that the tether extending from the housing through the upper part of the housing wall extends to the outside of the airbag cover. With this arrangement, liquid such as water or oil may enter the housing through the tether through hole from the exterior of the airbag cover. Particularly, general motorcycles have an airbag apparatus exposed to the outside of the body in contrast to cars, so that this problem may be pronounced under the influence of rain, cleaning water, and humidity.

SUMMARY OF THE INVENTION

The invention is made in view of the problems. Accordingly, it is an object of the invention to provide a technique effective in preventing liquid from flowing from the exterior of the airbag cover into the housing of an airbag apparatus for a motor cycle in which an airbag opening of a housing to store an airbag is covered by an airbag cover.

In order to achieve the above object, the invention described in the claims is provided. Typically, the invention can be applied in constructing airbag apparatuses to be mounted to various motorcycles. In this specification, "a motorcycle," a typical example of vehicles, includes various saddle-type vehicles that an occupant straddles, such as touring motorcycles having a fuel tank in front of an occupant seat and motor scooters having a space between an occupant seat and a handlebar-supporting head pipe. In addition to the motorcycles, the "motorcycle" includes vehicles that occupants straddle and having three or more running wheels (e.g., three-wheel motorbikes for use in home delivery service and three-or four-wheel buggies for bad roads) and vehicles that occupants ride on and running by sledges or caterpillars, such as snow mobiles.

A first form of the present invention for solving the above-described problem is an airbag apparatus mounted to a motorcycle and includes at least gas generation device, an airbag, a housing, an airbag cover, a through portion, and a passage interrupting device.

The gas generation device of the invention is a device for generating airbag inflation gas. The airbag of the invention restrains an occupant by deploying into an occupant restraining region in front of the occupant by the airbag inflation gas generated by the gas generation device in a frontal collision of the motorcycle. Here the "frontal collision" generally indicates that the motorcycle collides with a running or still front object such as a vehicle, a pedestrian, an obstacle or the like. The "occupant restraining region" is defined as a space extending in the direction of the forward movement of an occupant who is moving ahead of the motorcycle by a kinetic energy during a frontal collision, for restraining the occupant who is flung ahead of the motorcycle by the kinetic energy.

The housing of the invention houses at least an airbag and has an airbag opening that allows the deployment of the airbag. The housing is typically a bottomed-box-shaped retainer. The airbag cover of the invention covers an airbag housed in the housing.

The airbag cover of the invention has at least a top plate and an erect portion. The top plate extends to the opening surface of the airbag opening region of the housing. The erect portion extends from the lower surface (back) of the top plate of the airbag cover along the extension of the housing wall. The airbag cover is mounted to the outer circumference of the housing wall with the erect portion. Specifically, the airbag cover may be directly mounted to the outer circumference of the housing wall with the erect portion, or alternatively, may be indirectly mounted via another member. The erect portion mounted to the outer circumference of the housing wall is fixed with a fixing device such as a bolt or rivet and as such, the airbag cover is mounted to the housing.

The through portion of the invention is provided to the erect portion of the airbag cover. The through portion includes various holes, openings, cutoffs, grooves, and gaps that allow predetermined members to pass through or for use in mounting the airbag cover to the housing. This structure has the problem that liquid such as water or oil may enter the housing from the exterior through the through portion. Particularly, general motorcycles have an airbag apparatus exposed to the outside of the body in contrast to cars, so that this problem may be pronounced under the influence of rain, cleaning water, and humidity.

Accordingly, the invention adopts a structure in which the airbag apparatus has a passage interrupting device. The passage interrupting device interrupts the passage of liquid flowing from the outside of the airbag cover through the through portion into the housing. The passage interrupting device may be a passage interrupting wall (dam) on the cover outer or inner circumference around the through portion of the erect portion, a passage interrupting wall on the housing outer circumference around the through portion of the erect portion, or a passage interrupting step in which the upper end of the housing wall is located higher than the through portion. In the invention, the passage interrupting wall can be disposed at a desired portion in a passage from the exterior of the airbag cover through the through portion to the interior of the housing.

The arrangement of the airbag apparatus according to the first form of the invention can prevent liquid from flowing from the exterior of the airbag cover into the housing with the passage interrupting device.

A second form of the present invention for solving the above-described problem is an airbag apparatus wherein the passage interrupting device of the first form of the invention adopts a structure in which the upper end of the housing wall is located above the through portion. The through portion of the airbag cover may be disposed lower than the upper end of the housing wall. With this structure, the upper part of the housing wall and the through portion are disposed like steps, so that liquid such as water flowing into the through portion can be prevented from flowing into the housing by the housing wall serving as the passage interrupting device. The structure may use the housing wall itself, or alternatively, may use another member mounted to the upper part of the housing wall.

With this arrangement of the second form of the invention, the use of the structure of the housing as the passage interrupting device simplifies the structure of the passage interrupting device.

A third form of the present invention for solving the above-described problem is an airbag apparatus according further including a tether and a through hole in addition to the structure of the first or second form of the invention.

The tether of the invention is an elongated member that tethers the airbag in the housing to the vehicle body. The tether may be an elongated member having a strength sufficient to retain the airbag to the vehicle body. The "elongated member" of the invention broadly includes a belt and a strap, typically a belt-like webbing made of resin fibers or the like. The tether with such a structure has the function of restricting the forward movement of the airbag by retaining the airbag to the vehicle body by the tension upon completion of deployment of the airbag. The number of tethers of the invention may be varied to one or more as necessary. The tether through hole of the invention serves as a tether through portion at the erect portion so as to enable the tether to extend from the housing through the upper part of the housing wall to the outside of the airbag cover. The tether through hole is an opening according to the size of the tether, thus needing some sectional area. The tether through hole may have the possibility of water influx. For the structure, the passage interrupting device of the invention is particularly effective in interrupting the passage of water flowing into the housing through the tether through hole.

Particularly in the airbag apparatus having an elongated tether for tethering the airbag to the vehicle body, the invention of the third form can prevent liquid from flowing from the exterior of the airbag cover into the housing through the tether through hole of the erect portion of the airbag cover.

A fourth form of the present invention for solving the above-described problem is a motorcycle with an airbag apparatus according to one of the first, second, or third forms of the invention.

Thus, the invention of the fourth form can provide a motorcycle having an airbag apparatus capable of preventing the inflow of the liquid from the exterior of the airbag cover into the housing.

In the airbag apparatus for motorcycles with a structure in which the airbag opening of an airbag housing is covered with an airbag cover, the invention can prevent the liquid from flowing from the exterior of the airbag cover through the through portion into the housing using the passage interrupting device.

BRIEF DESCRIPTION OF THE INVENTION

FIG. 1 is a side view of a motorcycle 100 according to an embodiment of "a motorcycle" of the invention, showing a state in which an airbag apparatus 120 is mounted to the motorcycle 100.

DETAILED DESCRIPTION OF THE PREFERRED EMBODIMENTS

Figure 1:
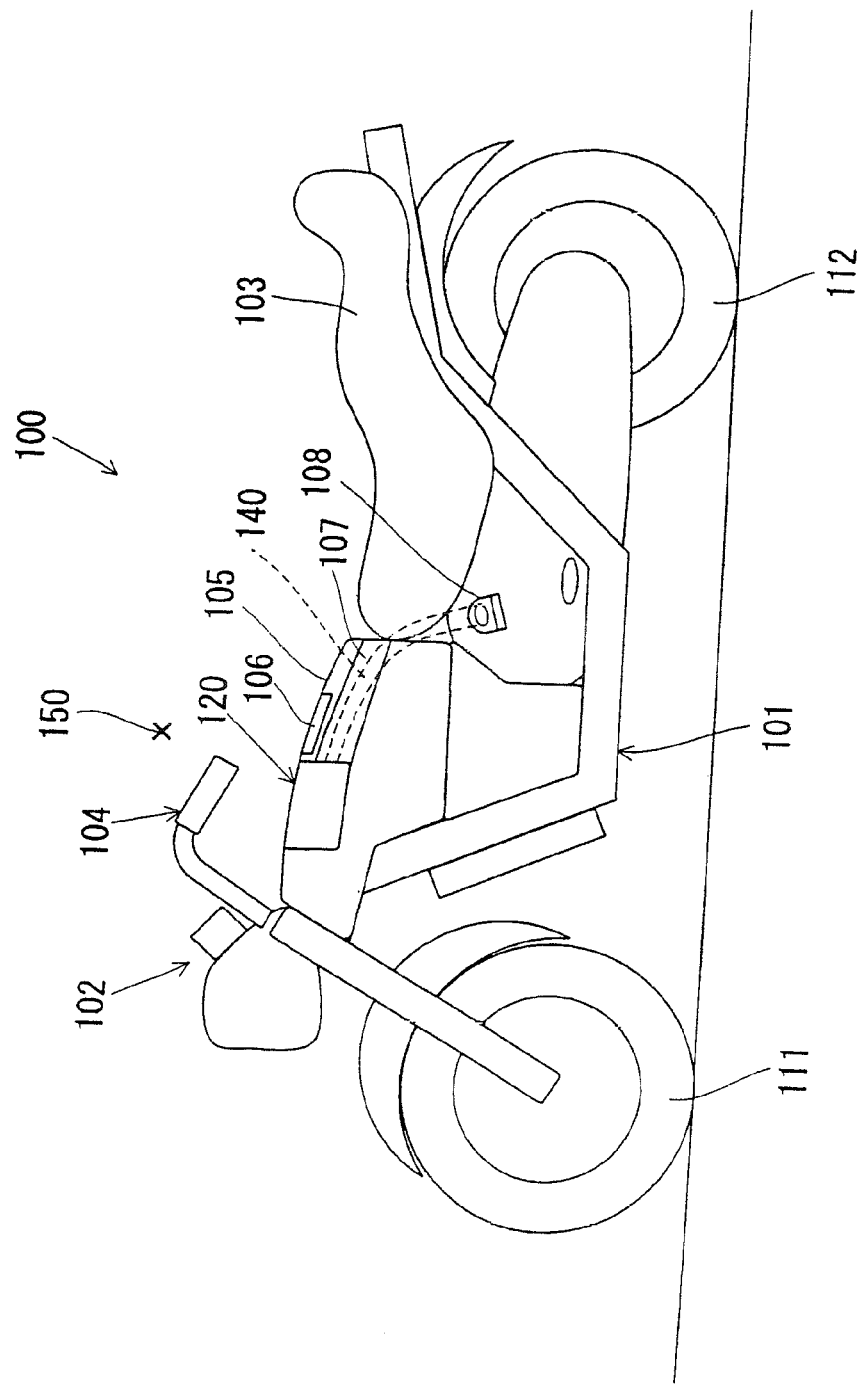
Figure 2:
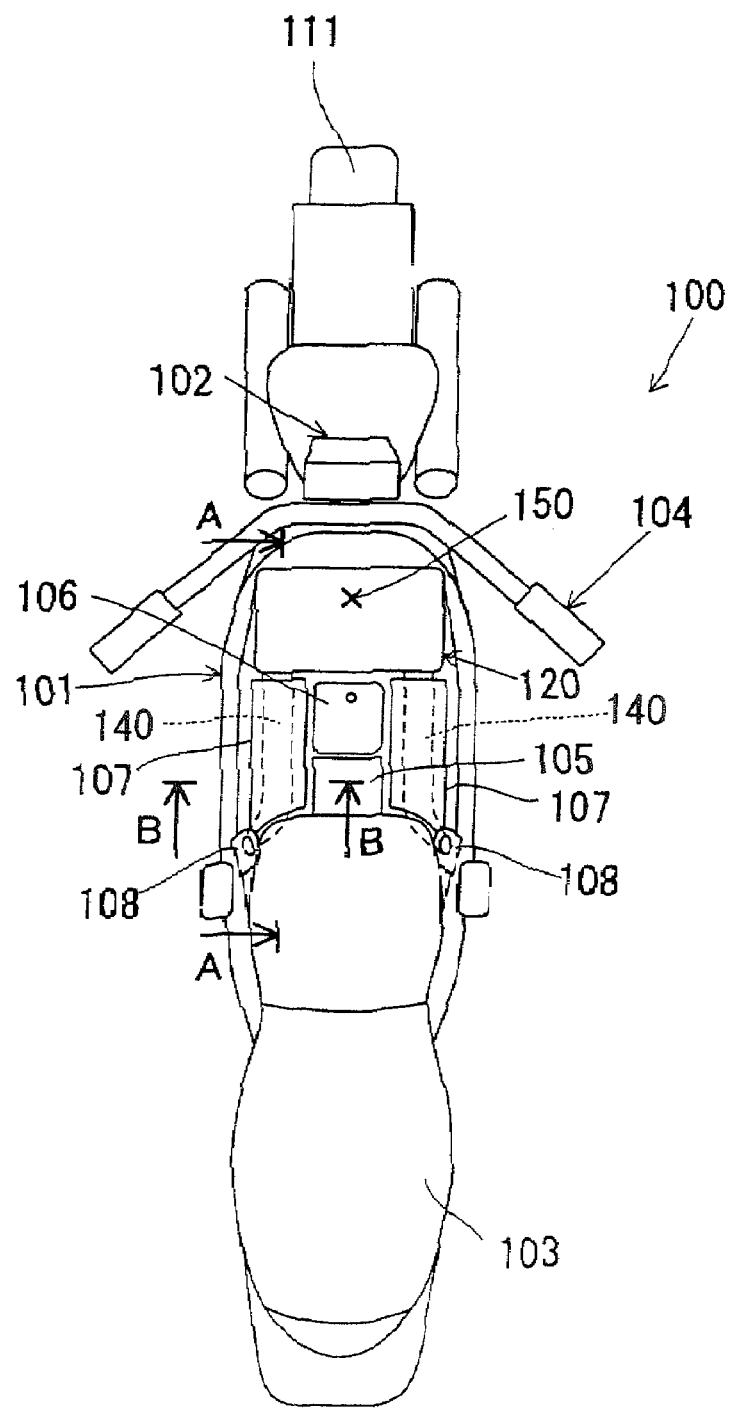
FIG. 2 is a diagram showing the motorcycle 100 in FIG. 1 as viewed from the top thereof.

An embodiment of the present invention will be described specifically with reference to the drawings. Referring first to FIGS. 1 and 2, the entire structure of a motorcycle 100 will be described. FIG. 1 is a side view of the motorcycle 100 according to an embodiment of the invention, showing a state in which an airbag apparatus 120 is mounted to the motorcycle 100. FIG. 2 shows the motorcycle 100 of FIG. 1, viewed from the top of the vehicle. The motorcycle 100 of the embodiment is an example of "a motorcycle" or "a motorcycle vehicle" of the invention.

Referring to FIGS. 1 and 2, the motorcycle 100 is what is called a touring motorcycle and mainly comprises a body frame 101 including an engine and a main frame; a seat 103 that occupants can straddle; handlebars 104; a front wheel 111; and a rear wheel 112.

A region above the body frame 101 of the motorcycle 100 and in front of an occupant seated in the seat 103 is defined as an occupant restraining region 150 in the event of a frontal collision of the motorcycle 100. The "frontal collision" in the embodiment indicates that the motorcycle 100 collides with various front objects (e.g., a vehicle, a pedestrian, an obstacle, and a guardrail, not shown for convenience sake). The "occupant restraining region 150" of the embodiment corresponds to "an occupant restraining region" of the invention, which is defined as a space extending in the direction of the forward movement of an occupant seated in the seat 103 during a frontal collision, for restraining the occupant who is flung ahead of the motorcycle by a kinetic energy.

A front portion 102 of the body frame 101 includes a headlight, various meters, switches, a windshield, and the like. A fuel tank 106 is disposed at the front of a body component 105 between the front portion 102 and the seat 103. The airbag apparatus (also referred to as an airbag module) 120 is disposed in front of the fuel tank 106. Webbing covers 107 for covering a pair of right and left webbings 140 that is a component of the airbag apparatus 120 are disposed on both sides of the fuel tank 106. The webbings 140 cannot or hardly be seen from the exterior owing to the covering by the webbing covers 107 in a normal state in which the airbag apparatus 120 is inoperative. The webbings 140 will be specifically described later in the description of the airbag apparatus 120.

The structure of the airbag apparatus 120 of this embodiment will be specifically described with reference to FIGS. 3 to 14. The airbag apparatus 120 is disposed so as to face the occupant restraining region 150 for the occupant seated in the seat 103. The airbag apparatus 120 corresponds to "an airbag apparatus" of the invention.

Figure 3:
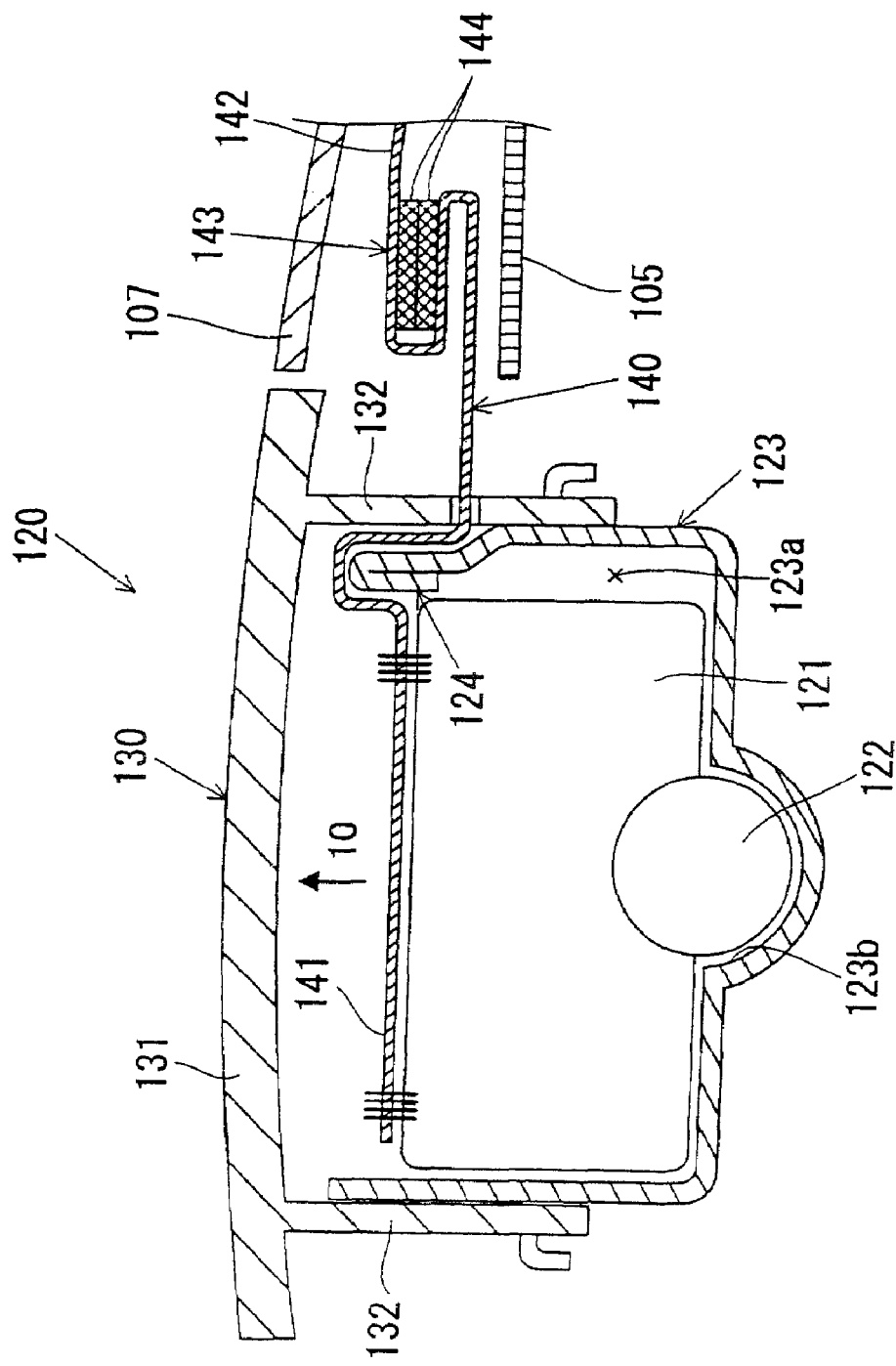
FIG. 3 is a sectional view of the motorcycle 100 in FIG. 2 taken along line A-A.
Figure 4:
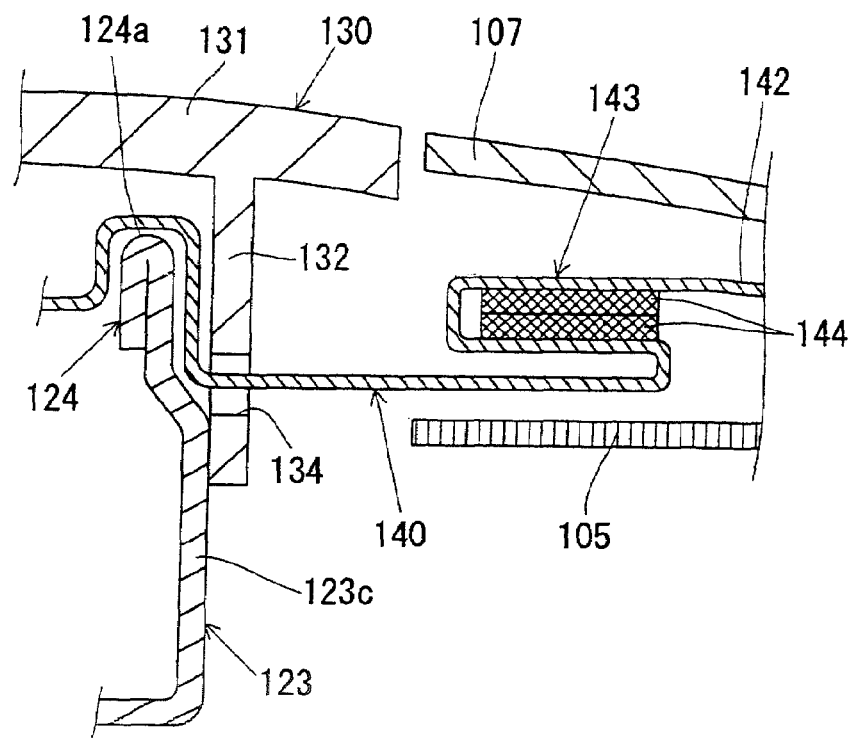
FIG. 4 is a fragmentary enlarged view of FIG. 3.
Figure 5:
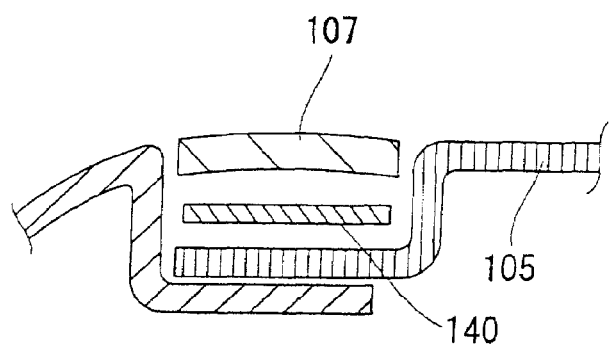
FIG. 5 is a cross sectional view of the motorcycle 100 taken along line B-B in FIG. 2.

FIG. 3 is a sectional view of the motorcycle 100 in FIG. 2 taken along line A-A; FIG. 4 is a fragmentary enlarged view of FIG. 3; and FIG. 5 is a cross sectional view of the motorcycle 100 taken along line B-B in FIG. 2. As shown in FIGS. 3 and 4, the airbag apparatus 120 mainly comprises an airbag 121, an inflator 122, a retainer 123, a module cover 130, and the webbings 140.

The airbag 121 is housed in the retainer 123 in a predetermined folded state (like a bellows or a roll) as shown in FIGS. 3 and 4. In FIG. 3, the direction of the inflation (deployment) of the airbag 121 is indicated by arrow 10. The airbag 121 is made of a material similar to airbag cloth for cars. The airbag 121 corresponds to "an airbag" of the invention.

The inflator 122 is a gas supply device that generates inflation gas and supplies it into the airbag 121 at a vehicle collision so that the airbag 121 in a folded state inflates while deploying from the retainer 123. The inflator 122 corresponds to "gas generation device" of the invention.

The retainer 123 is shaped like a bottomed box having at least an airbag housing 123a for the airbag 121 and an inflator housing (recess) 123b for the inflator 122. The retainer 123 houses the airbag 121 and has an opening ("airbag opening" of the invention) at the top, which allows the deployment of the airbag 121. The retainer 123 is typically formed by pressing a metallic material. The retainer 123 corresponds to "a housing."

In this embodiment, the webbings 140, to be described later, extend from the interior of the retainer 123 to the exterior. Accordingly, the webbings 140 may be locally worn down by contact with the retainer 123 when the vehicle vibrates during traveling, when the webbings 140 are retracted from the housing for maintenance, and when the webbings 140 are extended from a loose state with the deployment of the airbag 121. A retainer wall 123c of the retainer 123 of the embodiment therefore has a bent portion 124 at the portion with which the webbing 140 may come into contact. The bent portion 124 has a smooth surface (a smooth surface 124a in FIG. 4) at the upper end of the metal-plate retainer 123. The smooth surface 124a is formed by folding back (bending) the upper end (plate end) of the retainer 123. The smooth surface 124a is an arc-shaped smooth surface (arcuate surface) corresponding to part of a circle or ellipse and as such, and it has a function of reducing the sliding resistance between the contact portion of the retainer 123 and the webbings 140 to enable smooth sliding.

Specifically, the smooth surface 124a is shaped to allow the movement of the webbings 140 while maintaining surface contact with the webbings 140 in the moving direction of the webbings 140 when the vehicle vibrates, when the webbings 140 are retracted for maintenance, and when the webbings 140 are moved with the deployment of the airbag 121. At that time, the curvatures of the webbings 140 and the smooth surface 124a are substantially equal at the region where the webbings 140 and the smooth surface 124a are in contact. In other words, the smooth surface 124a serves to guide the webbings 140 relative to the retainer 123 while maintaining the surface contact so as to agree the curvature of the webbings 140 with the curvature of the smooth surface 124a.

This arrangement can prevent the wear of the webbings 140 made of, e.g., fibers due to contact with the metallic retainer 123 by use of the smooth surface 124a of the bent portion 124. Since, in this embodiment, the retainer 123 itself in contact with the webbings 140 has the smooth surface 124a, the smoothing structure is simplified, thus decreasing the number of components. It is preferable to increase the surface area of the smooth surface 124a of the bent portion 124 to thereby disperse the local frictional force to the webbings 140. A more detailed description of the retainer 123 will be given hereinlater.

The module cover 130 covers the opening (airbag opening) of the retainer 123 from above to thereby cover the housed airbag 121, and has at least a top plate 131 and an erect portion 132, as shown in FIGS. 3 and 4. The module cover 130 is typically molded of a resin material. The module cover 130 corresponds to "an airbag cover" of the invention.

The top plate 131 of the module cover 130 extends substantially horizontally in the direction of the opening surface at the airbag opening region of the retainer 123 to thereby form the upper surface of the airbag apparatus 120. The erect portion 132 of the module cover 130 is a plate portion and extends vertically from the lower surface (back) of the top plate 131 along the retainer wall 123c (hooked portion) of the retainer 123 to cross the extending direction of the top plate 131. The erect portion 132 is secured to the retainer wall 123c with fixtures 128, to be described later, to thereby join the module cover 130 and the retainer 123 together. The top plate 131 corresponds to "a top plate", and the erect portion 132 corresponds to "an erect portion" of the invention.

Referring to FIG. 4, a pair of right and left webbing through holes 134 that communicate the interior of the module cover 130 with the exterior is provided at the part of the rising portion 132 adjacent to the rear of the vehicle (adjacent to the occupant). The webbings 140, to be described later, can extend from the interior to the exterior of the module cover 130 through the webbing through holes 134. When the top plate 131 receives the deploying force of the airbag 121 at a vehicle collision, the module cover 130 is torn open along a tear line 133 and two tear lines 135, to be described later, of the erect portion 132, to release the covering of the opening (airbag opening) of the retainer 123. This enables the deployment of the airbag 121. A more detailed description of the module cover 130 will be given hereinlater.

In this embodiment, the airbag 121 is tethered to the body of the motorcycle 100 with the pair of right and left elongated webbings 140. The webbings 140 are formed like a belt made of the same material as that of car seatbelts (resin fiber belt) or the same material as that of airbag cloth. The webbings 140 may be formed like a strap instead of the belt. A first end 141 of each webbing 140 is stitched to the airbag 121 and a second end 142 is joined to a fastener (a fastener 108 in FIGS. 1 and 2) on the body. In other words, the webbings 140 extend in the front and back direction in parallel at two positions between the airbag apparatus 120 and the vehicle body. As shown in FIGS. 4 and 5, when the airbag apparatus 120 is in an inoperative state, the webbings 140 extend in the housing space between the webbing covers 107 and the body component 105, and the upper parts of the webbings 140 are covered with the webbing covers 107. The webbings 140 correspond to "tethers" of the invention.

Since the webbings 140 are in an irregularly loose state while the airbag is housed, the extending motion of the webbings 140 from the loose state with the deployment of the airbag at a frontal collision of the vehicle may exert an influence on a desired deploying motion of the airbag 121. Therefore, in the embodiment, each webbing 140 has a folded portion 143 below the webbing cover 107 so as to keep the looseness of the webbing 140 in a predetermined bunched state before the activation of the airbag apparatus 120 (while the airbag 121 is housed). The loose portions at the folded portions 143 of the webbings 140 are piled (folded back). The opposing surfaces of the loose portion are provided with a hook-and-loop fastener 144 that can temporarily hold the loose portion in the folded state (the predetermined bunched state).

The hook-and-loop fastener 144 has a known structure, which is a detachable tape using a pile structure and is the so-called Velcro fastener. Specifically, the hook-and-loop fastener 144 has small mushroom-shaped expanded portions (or hooks) on one surface, and loops on the other surface. When the two surfaces are put together, the mushroom portions (or hooks) are caught (hooked) in the loops, so that they easily stick to each other; when they are pulled from each other, the mushrooms come out from the loops, so that they are easily peeled from each other.

With such a structure, the folded (bunched) state of the folded portion 143 while the airbag is housed can temporarily be kept by the hook-and-loop fastener 144. On the other hand, when a predetermined tensile load is applied to the webbings 140 at the deployment of the airbag 121, the retaining force by the hook-and-loop fastener 144 is released, so that the folded (bunched) state of the folded portion 143 is released.

Figure 6:
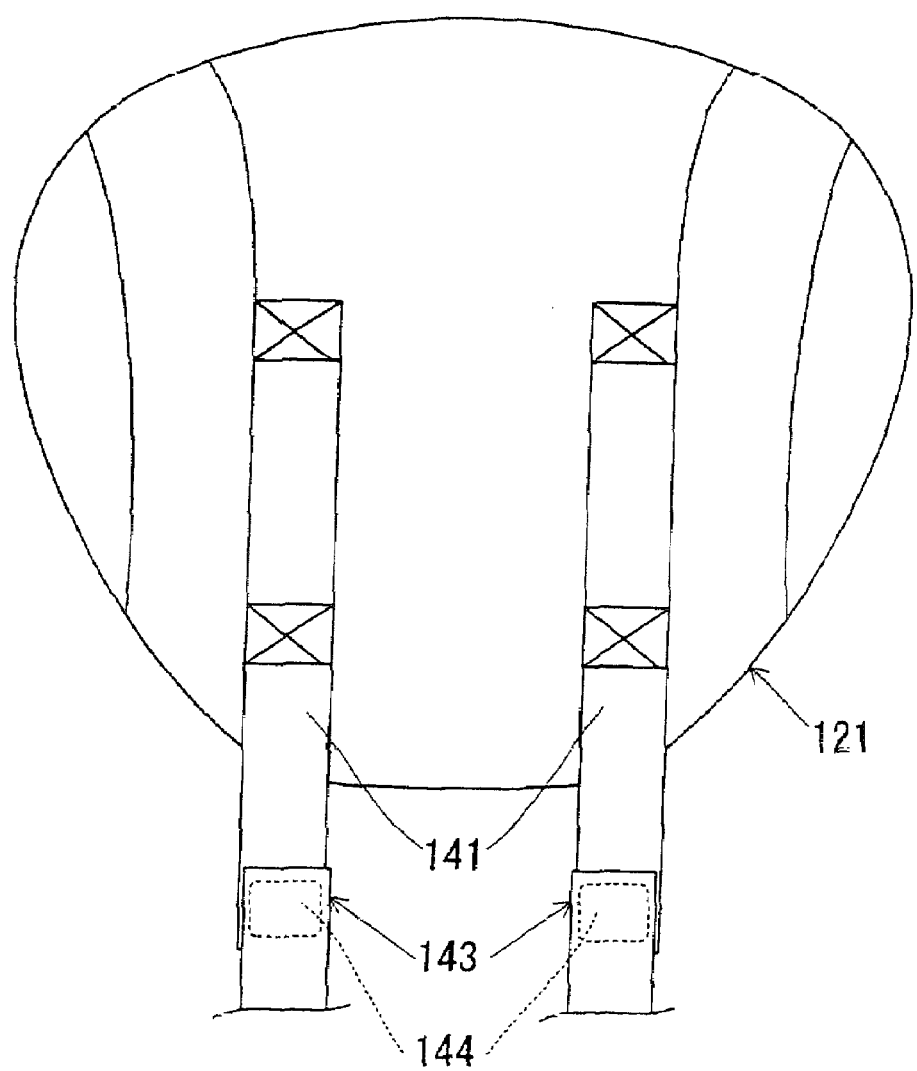
FIG. 6 shows the structure of folded portions 143 of webbings 140 of the embodiment.

FIG. 6 shows the structure of the folded portions 143 of the webbings 140 of the embodiment. As shown in FIG. 6, in this embodiment, the folded portions 143 are disposed substantially symmetrically. This arrangement can reduce the looseness of the webbings 140 while the airbag is housed and makes the loads of the right and left webbings 140, which extend at the deployment of the airbag 121, on the airbag 121 substantially equal, thus being effective in deploying the airbag 121 laterally equally.

For the webbing holding structure, the embodiment can employ another webbing holding device other than the hook-and-loop fastener 144, provided that the folded state of the folded portions 143 can temporarily be held. For example, the folded state of the folded portions may be temporarily kept by a structure in which the folded portions are stitched up with a tear seam or a structure in which the folded portions are wound by an adhesive tape or the like. At that time, an appropriate structure can be adopted for temporarily holding the loose portions of the webbings 140 in a predetermined folded state (a predetermined folded-back state) or in a predetermined wound state with a webbing holding device.

Figure 7:
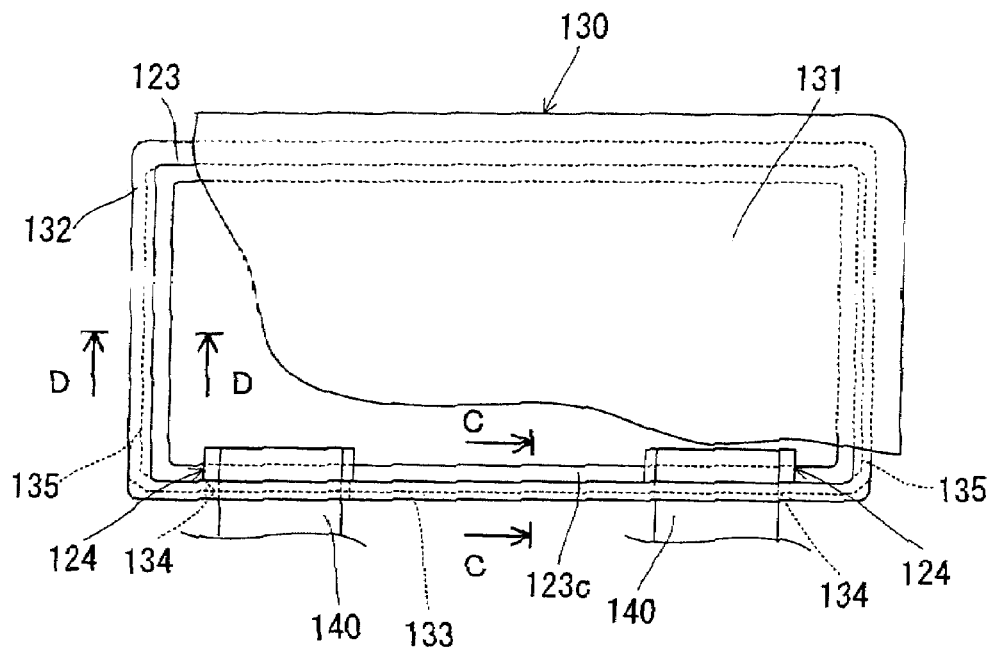
FIG. 7 shows a module cover 130 and a retainer 123 of the embodiment viewed from the top of the vehicle.
Figure 8:
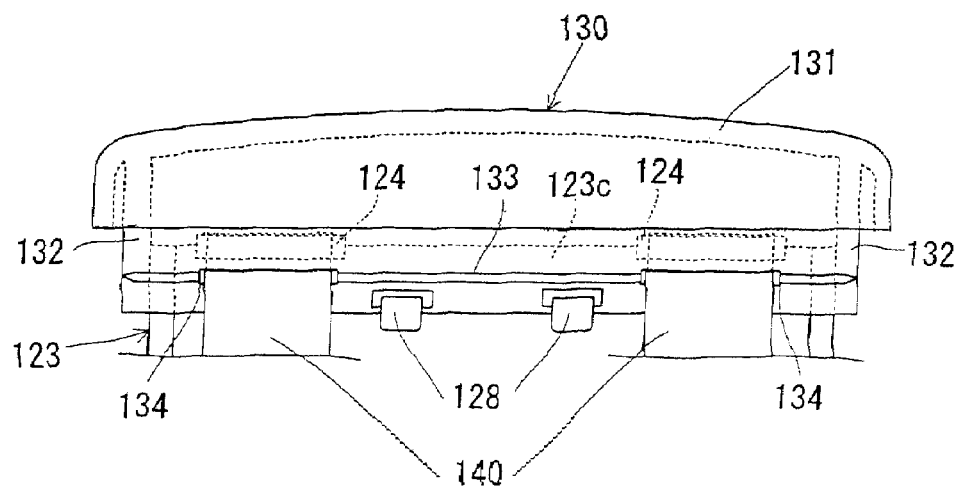
FIG. 8 shows the module cover 130 and the retainer 123 from the rear of the vehicle.
Figure 9:
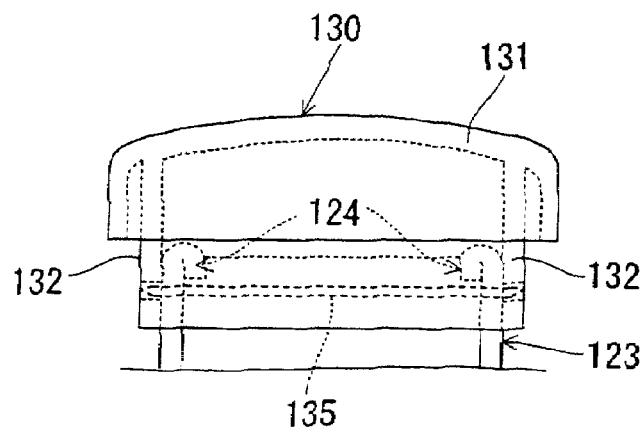
FIG. 9 shows the module cover 130 and the retainer 123 from the side of the vehicle.
Figure 10:
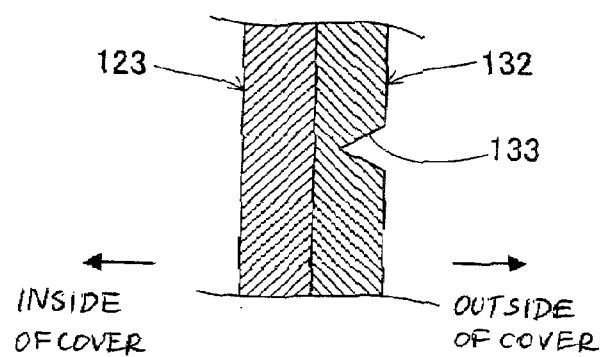
FIG. 10 shows a section taken along line C-C in FIG. 7.
Figure 11:
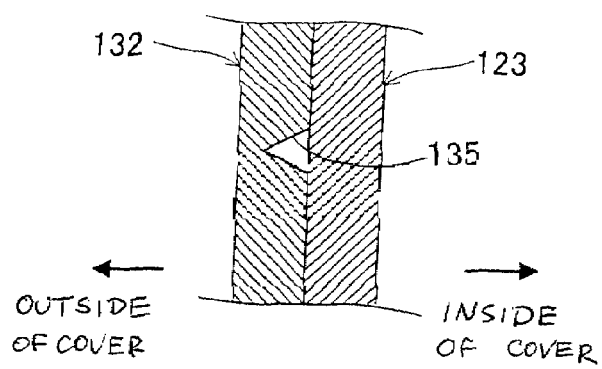
FIG. 11 shows a section taken along line D-D in FIG. 7.

Referring to FIGS. 7 to 11, a more detailed description of the module cover 130 will be given. FIG. 7 shows the module cover 130 and the retainer 123 of the embodiment viewed from the top of the vehicle; FIG. 8 shows them from the rear of the vehicle; FIG. 9 shows them from the side of the vehicle; FIG. 10 shows a section taken along line C-C of FIG. 7; and FIG. 11 shows a section taken along line D-D of FIG. 7.

As shown in FIGS. 7 to 9, the erect portion 132 of the module cover 130 of the embodiment has a tear line 133 along the outer periphery thereof adjacent to the rear of the vehicle (adjacent to the occupant), and two tear lines 135 along the inner periphery on both sides. In this embodiment, the tear lines 133 and 135 are provided not to the top plate 131 but to the erect portion 132 which is situated apart from the top plate 131. Accordingly, even if a load such as an occupant or a burden is applied from above the module cover 130, the load is not directly applied to the tear lines 133 and 135, thus preventing the module cover 130 from being torn open along the tear lines 133 and 135. The embodiment may have a continuous tear line from the erect portion 132 of the module cover 130 across another portion of the top plate 131.

The disposition of the through holes 134 on the tear line 133 streamlines the structure because the installation locations are shared.

According to the embodiment, the webbing through holes 134 are disposed on the tear line 133 of the erect portion 132, thereby streamlining the structure by sharing the installation location. The webbing through holes 134 serve as the tether through hole of the erect portion 132 so as to enable the webbings 140 to extend from the interior of the retainer 123 through the upper part of the retainer wall 123c (bent portion 124) to the outside of the module cover 130 (refer to FIGS. 4, 7, and 8). The webbing through holes 134 correspond to "through portions" and "tether through holes" of the invention.

With the structure of the module cover 130 having the webbing through holes 134 at the erect portion 132, liquid such as water may enter the housing through the webbing through holes 134 from the exterior of the module cover 130. Particularly, general motorcycles have an airbag apparatus exposed to the outside of the vehicle body in contrast to cars, so that this problem may be pronounced under the influence of rain, cleaning water, and humidity. Thus, the embodiment is characterized in the relative position between the webbing through holes 134 and the retainer wall 123c of the retainer 123. Specifically, the upper end of the retainer wall 123c of the retainer 123 is formed like steps above the webbing through holes 134 of the module cover 130 (more specifically, refer to FIG. 4). The retainer wall 123c interrupts the passage of water flowing from the exterior of the module cover 130 through the webbing through holes 134 into the retainer 123, and serves as a passage interrupting device that interrupts the passage of liquid flowing from the outside of the airbag through the through portion into the housing of the invention. This arrangement enables interruption of the passage of liquid such as water flowing from the exterior of the module cover 130 into the webbing through holes 134 to prevent the liquid from flowing into the retainer 123 by the retainer wall 123c. In short, in the embodiment, the retainer 123 itself has a dam mechanism. This prevents water influx from the exterior of the module cover 130 into the retainer 123.

As shown in FIGS. 10 and 11, the tear lines 133 and 135 are formed by providing triangular cutouts in the erect portion 132. Thus three continuous grooves with a predetermined depth, or thin portions of a substantially even thickness within the thickness of the erect portion 132 are formed in the erect portion 132 adjacent to the rear and both sides of the vehicle. Thus the tear lines 133 and 135 are also referred to as "linear grooves", "thin portions", or "fragile portions" having a linear groove of a predetermined depth. Since the thickness at the tear lines 133 and 135 (the thickness of the thin portions) is appropriately set on the basis of the specifications of the airbag 121, such as a deploying force, the module cover 130 can be smoothly torn open along the tear lines 133 and 135 of the erect portion 132 by the deploying force of the airbag 121 in the event of a vehicle accident, so that the portion of the module cover 130 above the tear lines 133 and 135 deploys toward the front of the vehicle with the portion of the erect portion 132 adjacent to the front of the vehicle as the hinge. At that time, the portion of the cover lower than the tear lines 133 and 135 is secured to the retainer 123 when the tear lines 133 and 135 are torn open or the airbag 121 deploys such that fasteners 128 on the retainer 123 are hooked in the through holes of the erect portion 132 or fixed with rivets (refer to FIG. 8). The tear lines may be continuous grooves of a specified depth disposed at regular intervals, continuous perforations, or continuous slits disposed at regular intervals, instead of the continuous groove of a predetermined depth.

The cutoffs of the tear lines 133 and 135 of the embodiment may be formed in dies during the molding of the module cover, or alternatively, may be formed by post machining such as laser beam machining or ultrasonic machining after the molding of the module cover. The sections of the tear lines 133 and 135 may be varied to a triangle, a semicircle, etc. as appropriate. The tear line 133 may be formed along the inner circumference of the erect portion 132 adjacent to the rear of the vehicle (adjacent to the occupant), while the tear lines 135 may be formed along the outer circumference of the both sides of the erect portion 132.

Figure 12:
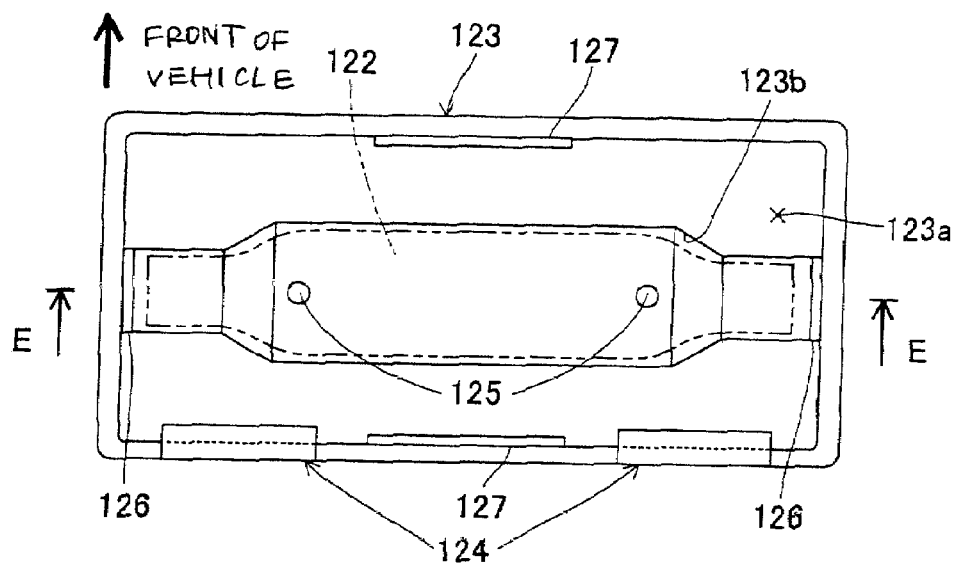
FIG. 12 shows the retainer 123 of the embodiment viewed from the top of the vehicle.
Figure 13:
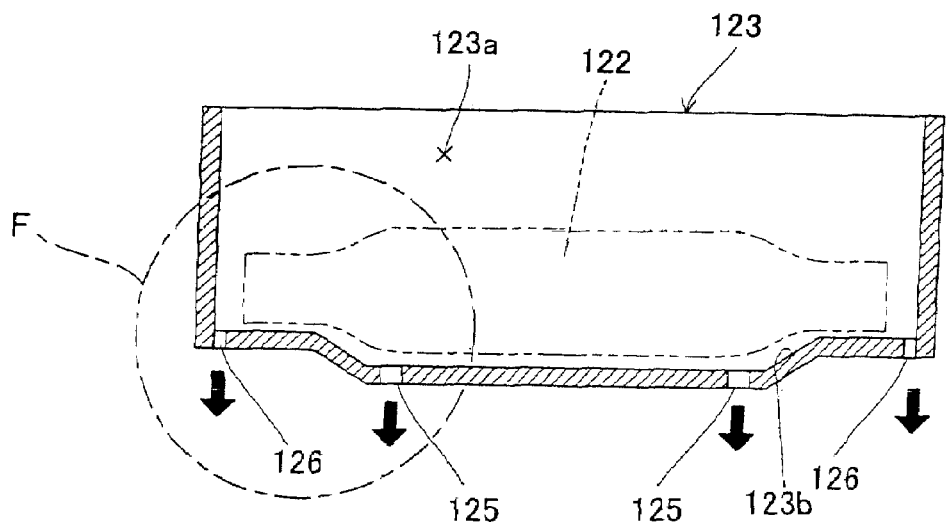
FIG. 13 shows a section taken along line E-E in FIG. 12.
Figure 14:
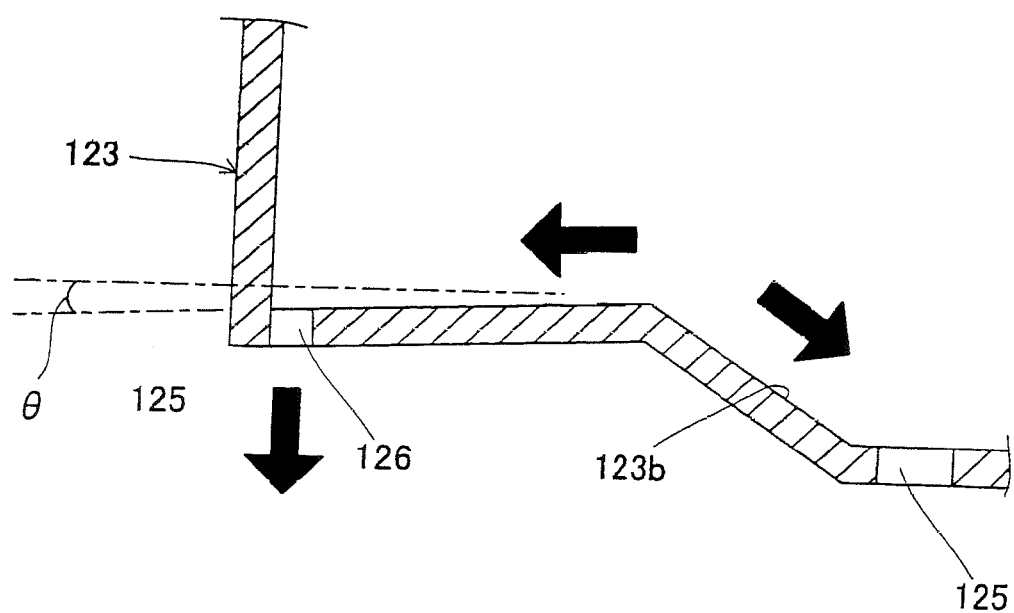
FIG. 14 is an enlarge view of part F in FIG. 13.

Referring then to FIGS. 12 to 14, a more detailed structure of the retainer 123 will be presented. FIG. 12 shows the retainer 123 of the embodiment viewed from the top of the vehicle; FIG. 13 shows a section taken along line E-E of FIG. 12; FIG. 14 shows an enlarged view of part F in FIG. 13.

As shown in FIGS. 12 and 13, the retainer 123 of the embodiment has a pair of hole-like first through portions 125 at an inflator housing 123b at the bottom of the retainer 123, a pair of slit-like second through portions 126 at the right and left ends, and a pair of slit-like third through portions 127 at the front and rear ends. The first through portions 125, the second through portions 126, and the third through portions 127 extend vertically through the bottom of the retainer 123, and have a function of draining water entering the retainer 123 to the outside of the retainer 123. Thus, the water entering the retainer 123 is continuously or intermittently drained through the first through portions 125, the second through portions 126, and the third through portions 127 to the outside of the retainer 123 by gravitation.

Since the housing like the retainer 123 of the embodiment is a bottomed box having an airbag opening on the top, liquid such as water or oil may be prone to enter or reside in the housing through the periphery of the airbag opening even with high tightness. Particularly, general motorcycles have an airbag apparatus exposed to the outside of the vehicle body in contrast to cars, so that such a problem may be pronounced under the influence of rain, cleaning water, and humidity. Accordingly, the embodiment has the first through portions 125, the second through portions 126, and the third through portions 127 for drainage at the bottom of the retainer 123. Of course, liquids such as oil entering the retainer 123 other than water may be drained from the retainer 123 through the first through portions 125, the second through portions 126, and the third through portions 127. The through portion for drainage may be holes, slits, mesh, a punching plate, or other openings. In this embodiment, the installation locations and the number of installation locations of the draining through portion may be varied as appropriate.

The first through portions 125 are located at the recessed inflator housing 123b, which is the lowest of the bottom of the retainer 123. More specifically, the bottom of the retainer 123 has a downward slope (curved slope) toward the first through portions 125. Accordingly, the water entering the retainer 123 is collected to the first through portions 125 along the slope of the inflator housing 123b, and is surely drained through the first through portions 125 to the outside of the retainer 123.

On the other hand, the second through portions 126 have the function of draining the water, which enters the retainer 123 and resides at the right and left ends thereof to the outside of the retainer 123 when the motorcycle 100 is parked at an angle using a side stand, or when the vehicle body tilts laterally during driving. Furthermore, as shown in FIG. 14, the bottom of the retainer 123 decreases in height toward the second through portions 126 (at an inclination angle θ). In other words, the bottom of the retainer 123 has a downward slope (linear slope) toward the second through portions 126. Thus, the water entering the retainer 123 is collected to the second through portions 126 along the slope of the bottom of the retainer 123 when the vehicle body tilts and even when the vehicle body is in a horizontal position, and is surely drained through the second through portions 126 to the outside of the retainer 123. Particularly, since the second through portions 126 are disposed at the right and left ends of the retainer 123, the second through portions 126 easily become the lowest of the bottom of the retainer 123 when the motorcycle tilts to the right or left side, thus increasing the draining function. Motorcycles tilt to the right or left when parked at a rightward or leftward inclination, or when tilted to the right or left during driving on a right or left curve. The inclination angle θ of the bottom of the retainer 123 may be appropriately set according to the specifications of the retainer 123.

Furthermore, the third through portions 127 have the function of draining the water intruding into the retainer 123 and residing at the front and rear end. For example, the motorcycle 100 tilts on an upward slope or downward slope run because the front of the body becomes higher or lower than the rear. In this embodiment, the third through portion 127 on the front or rear side easily becomes the lowest of the bottom of the retainer 123, so that the water in the retainer 123 is surely drained from the retainer 123 through the third through portion 127. Vehicles tilt to the front or rear during running on an uphill or downhill slope or when the retainer 123 itself is combined to the body on a slant.

Preferably, for the draining structure of the embodiment in view of the surface tension of water, the first through portions 125 have a hole diameter of 7 mm or more (38 mm 2 or more in section area), and the second through portions 126 and the third through portions 127 have the same section area as that of the first through portions 125 or the same slit width as the hole diameter of the first through portions 125.

Figure 15:
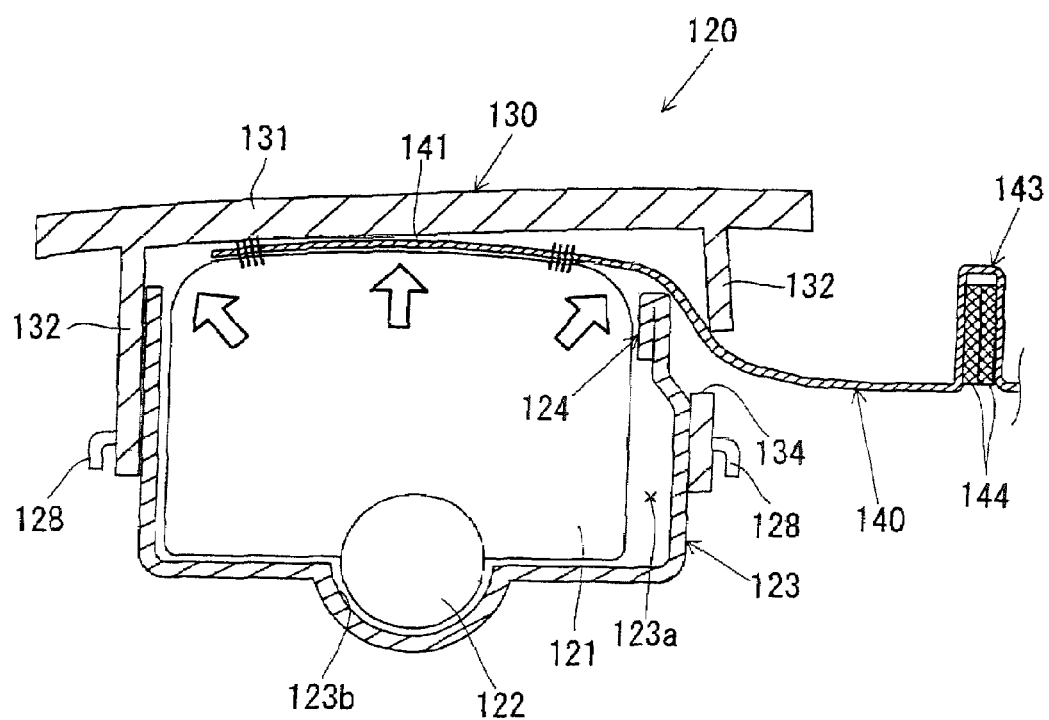
FIG. 15 shows the state of an airbag 121 of the airbag apparatus 120 at the start of inflation.
Figure 16:
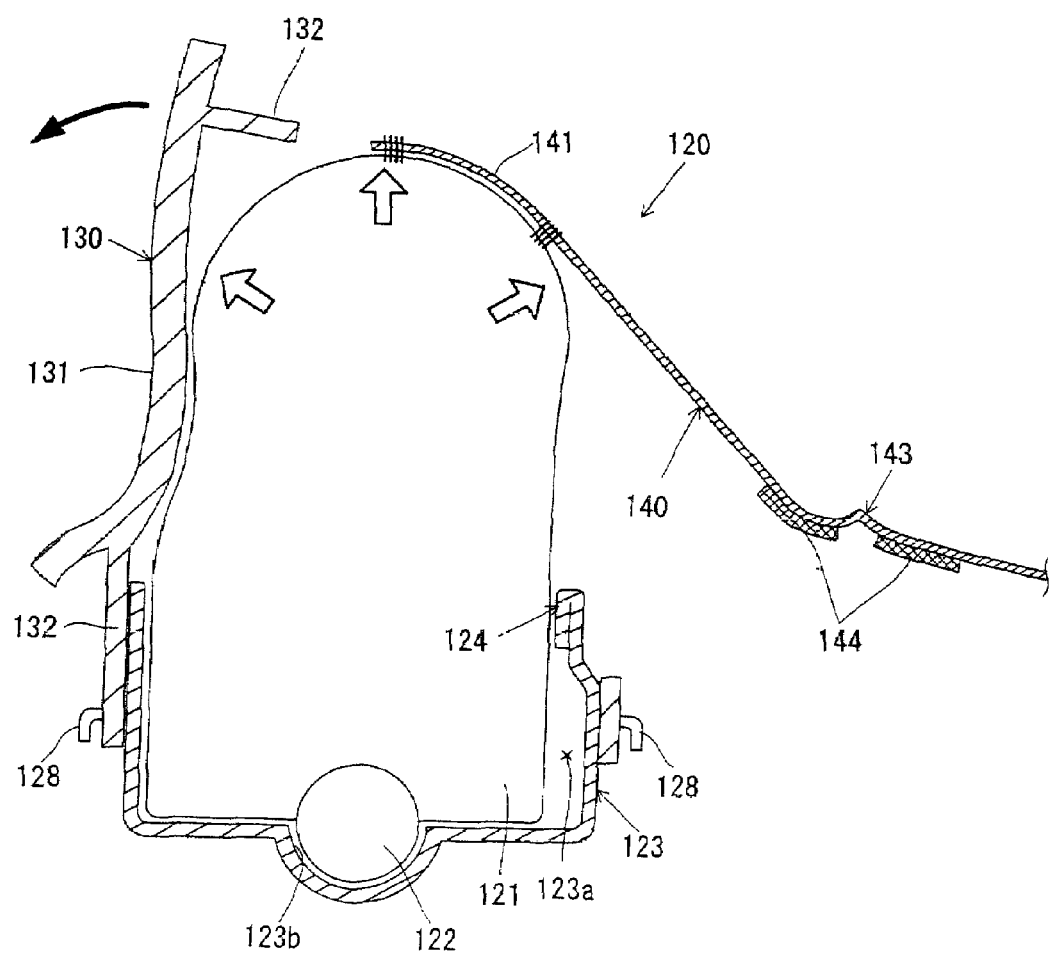
FIG. 16 shows the airbag 121 at the middle of inflation.
Figure 17:
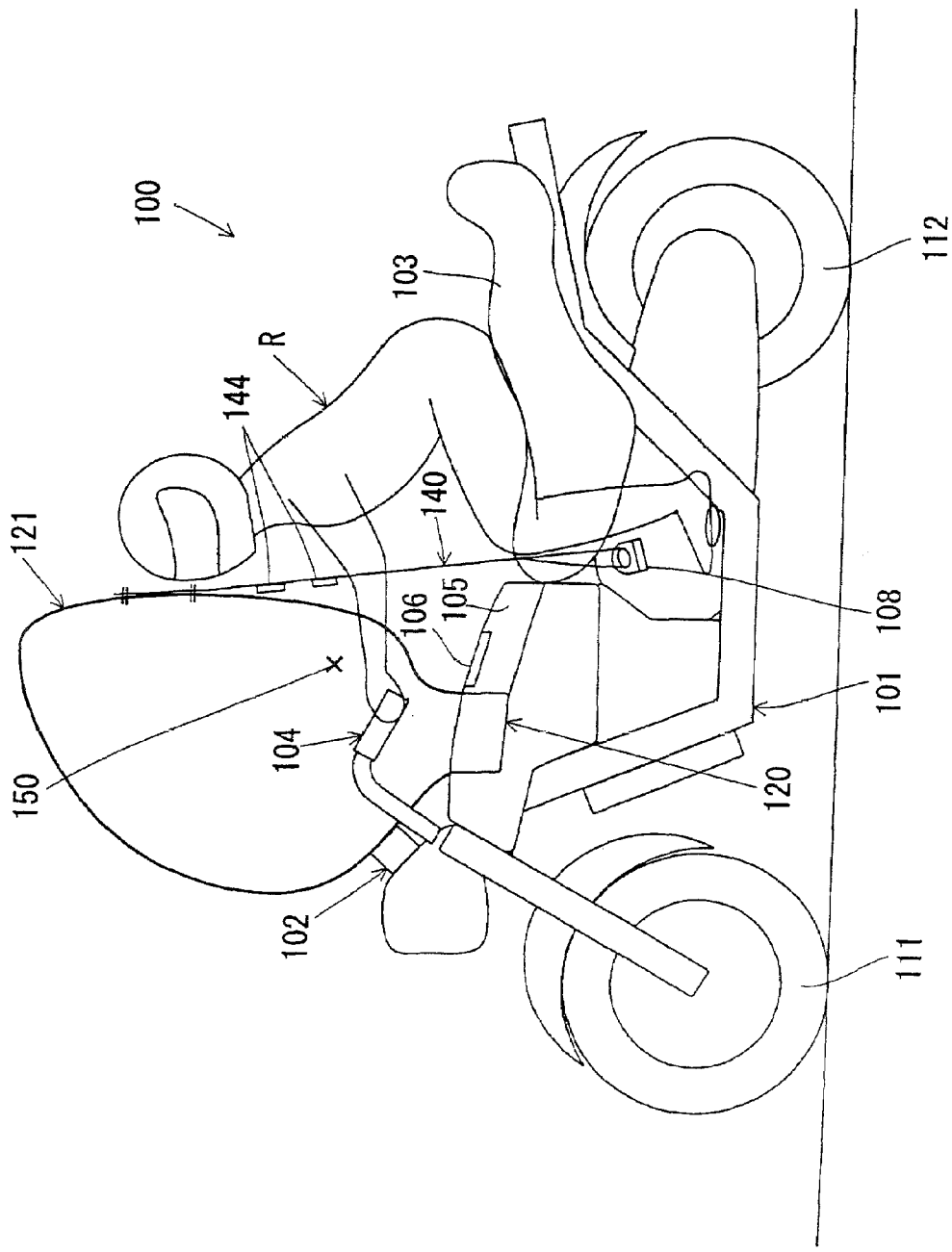
FIG. 17 shows the airbag 121 at the completion of inflation, as viewed from the side of the vehicle.
Figure 18:
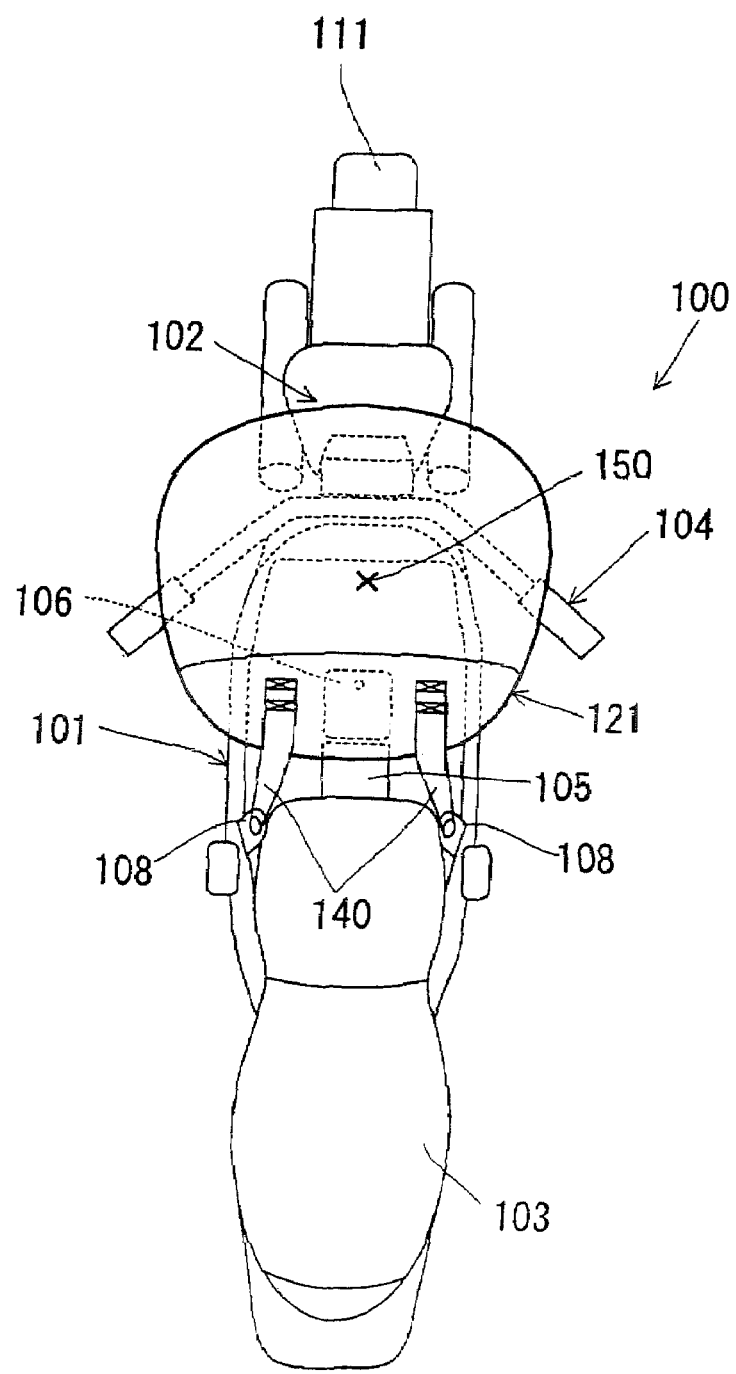
FIG. 18 shows the airbag 121 at the completion of inflation, as viewed from the top of the vehicle.

Referring now to FIGS. 15 to 18, the motion of the airbag apparatus 120 will be described. FIG. 15 shows the state of the airbag 121 of the airbag apparatus 120 at the start of inflation; FIG. 16 shows the airbag 121 at the middle of inflation; and FIGS. 17 and 18 show the airbag 121 at the completion of inflation. Specifically, FIG. 17 shows the airbag 121 at the completion of inflation, viewed from the side of the vehicle; and FIG. 18 shows the airbag 121 at the completion of inflation, viewed from the top of the vehicle.

When the motorcycle 100 comes into a collision in the traveling direction, the occupant is moving (flung) ahead of the motorcycle 100. In the embodiment, upon detection of the frontal collision, the inflator 122 of the airbag apparatus 120 is activated to supply inflation gas generated by the inflator 122 into the airbag 121. This starts the inflation (deployment) of the airbag 121 in the direction of arrow 10 in the airbag apparatus 120 of FIG. 3 in a state before activation. Since inflation gas is continuously fed into the airbag 121, the airbag 121 is expanded in sequence from the retainer 123.

As shown in FIG. 15, with the airbag 121 at the beginning of deployment, the airbag 121 in the process of deployment pushes the top plate 131 of the module cover 130 from below in the retainer 123. Thus the module cover 130 that has received a predetermined deploying force or more from the airbag 121 is torn open along the tear lines (the tear lines 133 and 135) of the erect portion 132. Upon starting the deployment of the airbag 121, the webbings 140 stitched to the airbag 121 is subjected to a tensile load via the first end 141.

Thus the webbings 140 pushes open the webbing covers 107 upward to thereby release the covering by the webbing covers 107.

As shown in FIG. 16, with the airbag 121 in the middle of deployment, the module cover 130 torn open along the tear lines further receives the deploying force from the airbag 121 to deploy ahead of the vehicle with the portion of the erect portion 132 adjacent to the front of the vehicle as the hinge. At that time, when a further tensile load is applied to the webbings 140 via the first end 141, the retaining force by the hook-and-loop fastener 144 is canceled, so that the folded state of the folded portions 143 is released. Since the folded portions 143 of the webbings 140 of the embodiment are generally disposed symmetrically, the loads on the airbag 121 by the webbings 140 extending during the deployment of the airbag 121 can be made substantially equal on the right and left, whereby the airbag 121 can deploy bilaterally evenly.

Thus, as shown in FIGS. 17 and 18, the airbag 121 is completely deployed. In this state, the inflated airbag 121 fills the occupant restraining region 150 in front of a rider R in FIG. 17. Thus, the rider R who is moving forward by the kinetic energy of the collision is restrained by the airbag 121 and the impact to the rider R during restraint is reduced.

The webbings 140 fully extend substantially linearly between the airbag 121 and the fastener 108 to restrict the motion of the airbag 121 moving upward and forward of the vehicle by the tension thereof. The fully inflated airbag 121 comes into contact with the front portion 102 at the front of the vehicle, and into contact with the handlebars 104 at both sides. This arrangement stabilizes the restraint of the rider R with the fully inflated airbag 121.

According to the embodiment, the upper end of the retainer wall 123c of the retainer 123 is located above the webbing through holes 134 of the module cover 130 and formed like steps, thereby preventing the liquid such as water, which flows from the exterior into the webbing through holes 134, from flowing into the retainer 123 with the retainer wall 123c. This prevents water influx from the exterior of the module cover 130 into the retainer 123. Particularly, the embodiment can provide a simple passage interrupting structure because the retainer 123 itself has the passage interrupting structure owing to the difference in height between the upper end of the retainer wall 123c and the webbing through holes 134.

Since the structure of the embodiment in which the upper end of the retainer wall 123c and the webbing through holes 134 of the module cover 130 are different in height, as in the embodiment, local stress may be prone to concentrate on the webbings 140 in contact with the upper end of the retainer wall 123c. Therefore, for the passage interrupting structure, the function of reducing the slide resistance between the retainer 123 and the webbings 140, like the bent portion 124, is particularly effective.

It is to be understood that the invention is not limited to the above-described embodiment, but various applications and modifications can be made. For example, the following applications are possible.

In the above embodiment, the influx of liquid such as water into the retainer 123 is prevented by the passage interrupting structure (dam structure) in which the retainer wall 123c of the retainer 123 is disposed above the webbing through holes 134. Alternatively, the invention may have the passage interrupting structure at the module cover 130 or between the retainer 123 and the module cover 130. In other words, the invention may dispose the passage interrupting wall in a desired position in the passage from the exterior of the module cover 130 through the webbing through holes 134 into the retainer 123. For example, the passage interrupting structure may be achieved by another structure as shown in FIG. 19.

Figure 19:
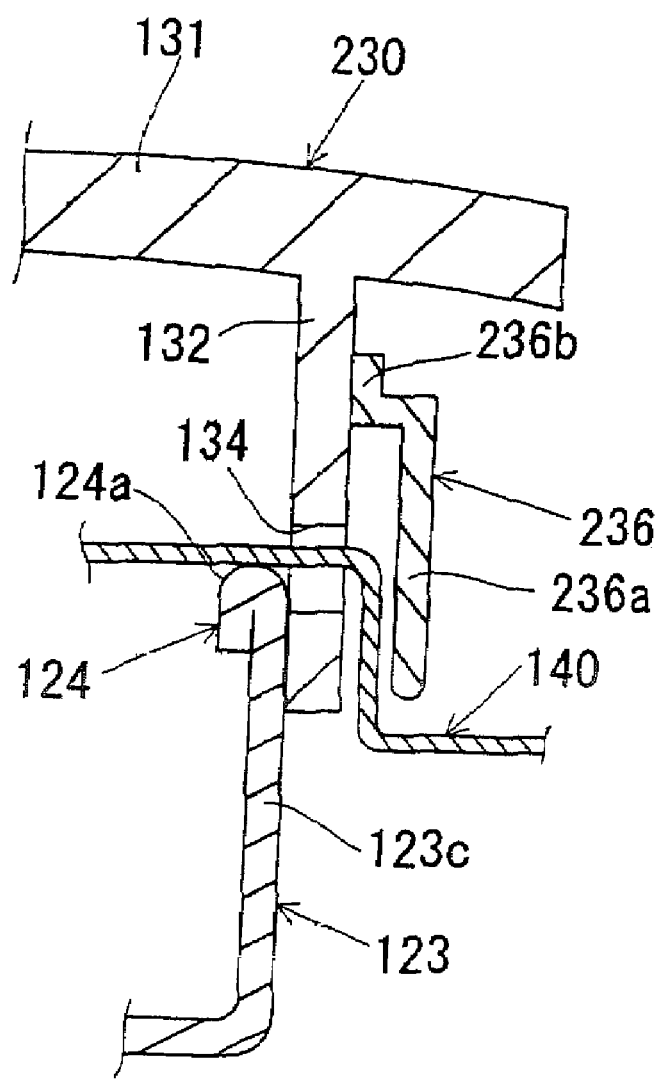
FIG. 19 is a fragmentary sectional view of a module cover 230 according to another embodiment.

FIG. 19 is a fragmentary sectional view of a module cover 230 according to another embodiment. The module cover 230 shown in FIG. 19 has an interrupting member 236 mounted to the outer circumference of the erect portion 132 with a mounting portion 236b. The interrupting member 236 has a wall 236a extending from above the webbing through hole 134 downward along the extension of the erect portion 132. The wall 236a covers the webbing through hole 134 from the outside while allowing the webbing 140 to pass through the webbing through hole 134. The interrupting member 236 is made of resin as are the top plate 131 and the erect portion 132, and is fixed to the erect portion 132 with a bolt or a rivet. The interrupting member 236 interrupts the passage of water flowing from the outside of the module cover 230 into the webbing through hole 134, and serves as the passage interrupting device of the invention. This arrangement enables the influx of liquid such as water from the exterior of the module cover 230 into the webbing through hole 134 to be interrupted by using the interrupting member 236. Alternatively, an interrupting member similar to the interrupting member 236 of FIG. 19 may be disposed on the inner circumference of the erect portion 132 in place of the outer circumference.

While the embodiment has a structure of interrupting the passage of water flowing through the webbing through holes 134 of the module-cover erect portion 132, the invention may be applied to a passage interrupting structure of various types of through portions at the module-cover erect portion 132.

While the embodiment has been described with reference to the motorcycle 100 of what is called a touring type, the invention may be applied to other types of motorcycle such as motor scooters having a space that enables lateral movement of the rider's legs between the handlebars and the seat and to motorcycle vehicles other than the motorcycle 100.

While the embodiment has been described about the case in which the airbag apparatus 120 is disposed in front of the fuel tank 106, the position of the airbag apparatus 120 may be varied as appropriate, provided that the airbag 121 can deploy into a desired region in a vehicle collision. For example, the airbag apparatus 120 may be disposed behind or lower than that shown in FIG. 1.

What is claimed is:

1. An airbag apparatus in combination with a motorcycle to which the airbag apparatus is mounted, the combination comprising:
   a body of the motorcycle;
   an airbag;
   an inflator for supplying inflation gas to the airbag for airbag deployment;
   a retainer assembly mounted to the motorcycle body and being configured for housing the airbag therein to prior airbag deployment;
   a tether secured to the motorcycle body;
   an unobstructed opening in the retainer assembly sized for the tether to extend therethrough;
   a portion of the tether in the retainer assembly connected to the airbag so that the tether extends through the unobstructed opening to be secured to the motorcycle body and upon airbag deployment the tether anchors the airbag to the motorcycle body; and
   a fluid blocking device of the retainer assembly adjacent the opening that substantially keeps liquid from outside the retainer assembly from accessing the airbag and the inflator in the retainer assembly via the opening.

2. The combination of claim 1 wherein the retainer assembly includes a retainer base portion having upstanding side walls, and the fluid blocking device comprises one of the upstanding side walls of the retainer base portion.

3. The combination of claim 2 wherein the retainer assembly includes a cover portion having depending side walls and the one upstanding side wall of the retainer base portion has an upper end portion spaced from a corresponding upper end portion of one of the depending side walls of the cover portion adjacent the opening in the retainer assembly.

4. The combination of claim 3 wherein the one upstanding side wall of the retainer base portion has a lower end portion extending along and in engagement with a corresponding lower end portion of the one depending side wall portion of the cover portion below the opening.

5. The combination of claim 3 wherein the upper end portion of the one upstanding body and an additional side wall extends above the opening.

6. The combination of claim 1 including an additional tether secured to the motorcycle body and an additional opening in the retainer assembly sized for the additional tether to extend therethrough and an additional fluid blocking device associated with the additional opening that is operable to substantially keep liquid from outside the retainer assembly from accessing the airbag and the inflator in the retainer assembly via the additional opening.

7. The airbag apparatus of claim 6 wherein the additional opening is laterally spaced from the first opening in the retainer assembly on the same one of the upstanding side walls.

8. An airbag apparatus to be mounted to a motorcycle, the airbag apparatus comprising:
an airbag;
a retainer for housing the airbag in a folded state and having upstanding side walls extending about an opening through which the airbag is deployed;
a fixture on at least one of the upstanding side walls a cover portion covering the opening of the retainer and having peripheral side wall portions depending therefrom;
a fixture-receiving through hole in one of the peripheral side wall portions adjacent to the one upstanding side wall and sized for fitting the fixture therethrough to secure the retainer to the cover portion;
a tether-receiving through hole in the one peripheral side wall portion that is laterally larger than the fixture-receiving through hole so that the tether-receiving through hole is sized to receive a tether therethrough;
a fluid blocking device of the retainer assembly adjacent the larger, tether-receiving through hole that substantially keeps liquid from outside the retainer from accessing the airbag in the retainer via the larger tether-receiving through hole.

9. The airbag apparatus of claim 8 wherein the fluid blocking device comprises one of the upstanding side walls of the retainer.

10. The airbag apparatus of claim 9 wherein one of the retainer side walls has an upper end portion that extends above the tether-receiving through hole.

11. The airbag apparatus of claim 8 wherein one of the side walls has an upper portion adjacent to and above the tether-receiving through hole that is spaced from a corresponding peripheral side wall portion.

12. The airbag apparatus of claim 11 wherein the one of the side walls has a lower portion in mating contact with the corresponding peripheral side wall portion with the mating portion located below the tether-receiving through hole to prevent liquid from entering the housing.

13. The airbag apparatus of claim 8 wherein the fluid blocking device includes a blocking member mounted to an exterior surface of the one of the peripheral walls containing the tether-receiving through hole, with a portion of the blocking member extending down over the tether-receiving through hole.

14. The airbag apparatus of claim 13 wherein the portion of the blocking member extending down over the tether-receiving through hole is spaced from the peripheral wall.

15. An airbag apparatus to be mounted to a motorcycle, the airbag housing apparatus comprising:
an airbag;
a retainer for housing the airbag in a folded state and having upstanding side walls extending about an opening through which the airbag is deployed;
a cover portion covering the opening of the retainer and having peripheral side wall portions depending therefrom, with at least one of the peripheral side wall portions secured to at least one of the side walls of the retainer;
a through hole disposed on one of the peripheral side wall portions; and
a fluid blocking device of the retainer assembly adjacent the through hole that substantially keeps liquid from outside the retainer from accessing the airbag in the retainer via the through hole, wherein the fluid blocking device includes a blocking member mounted to an interior surface of the one of the peripheral walls containing the through hole, with a portion of the blocking member extending down over the through hole.

16. An airbag apparatus to be mounted to a motorcycle, the airbag apparatus comprising:
an airbag;
a retainer for housing the airbag in a folded state and having upstanding side walls extending about an opening through which the airbag is deployed;
a cover portion covering the opening of the retainer and having peripheral side wall portions depending therefrom, with at least one of the peripheral side wall portions secured to at least one of the side walls of the retainer;
a through hole disposed on one of the peripheral side wall portions;
a fluid blocking device of the retainer assembly adjacent the through hole that substantially keeps liquid from outside the retainer from accessing the airbag in the retainer via the through hole; and
tear lines disposed on a portion of the peripheral side wall portions, with the through hole being disposed along a portion of the tear lines.

17. A motorcycle comprising:
a body;
a seat of the body for supporting a rider seated thereon;
an airbag retainer mounted forwardly of the seat and having side walls about an opening;
an airbag housed in the retainer in a folded state for being deployed out of the opening and inflated rearwardly upon detection of a front collision of the motorcycle;
an inflator for supplying inflation gas to the airbag;
a cover portion covering the open portion of the retainer and having peripheral side wall portions depending therefrom, with at least one of the peripheral side walls attached to the retainer to secure the cover to the retainer;
a through hole disposed on one of the peripheral side wall portions;
an elongated tether that extends through the through hole and is secured at a first end to the airbag and at a second end to the body; and an upper end of one of the retainer side walls extending above the through hole substantially keeps liquid from outside the retainer from accessing the airbag and the inflator in the retainer via the through hole.

18. The airbag apparatus of claim 17 wherein the through hole is located on a rear facing peripheral side wall portion.

* * * * *

UNITED STATES PATENT AND TRADEMARK OFFICE
CERTIFICATE OF CORRECTION

PATENT NO.        : 7,547,039 B2                                        Page 1 of 1
APPLICATION NO. : 11/470924
DATED             : June 16, 2009
INVENTOR(S)       : Yasuhito Miyata It is certified that error appears in the above-identified patent and that said Letters Patent is hereby corrected as shown below:

Claim 17, Column 15, Line 2, delete "hole" and insert -- hole that --.

Signed and Sealed this

Fifteenth Day of September, 2009

David J. Kappos
*Director of the United States Patent and Trademark Office*